(12) United States Patent
Marvaniya et al.

(10) Patent No.: US 11,651,248 B2
(45) Date of Patent: May 16, 2023

(54) FARM DATA ANNOTATION AND BIAS DETECTION

(71) Applicant: International Business Machines Corporation, Armonk, NY (US)

(72) Inventors: Smitkumar Narotambhai Marvaniya, Bangalore (IN); Jitendra Singh, Gautam Budh Nagar (IN); Shantanu Ravindra Godbole, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 819 days.

(21) Appl. No.: 16/598,613

(22) Filed: Oct. 10, 2019

(65) Prior Publication Data

US 2021/0110283 A1   Apr. 15, 2021

(51) Int. Cl.
*G06Q 30/02*   (2012.01)
*G06N 5/04*   (2023.01)
(Continued)

(52) U.S. Cl.
CPC ............ *G06N 5/04* (2013.01); *A01C 21/007* (2013.01); *G06N 20/00* (2019.01); *G06Q 10/06* (2013.01);
(Continued)

(58) Field of Classification Search
CPC .... G06Q 30/02; G06Q 10/06; G06Q 10/0631; G06Q 50/02; G06Q 30/0254;
(Continued)

(56) References Cited

U.S. PATENT DOCUMENTS

| 8,694,401 B2 | 4/2014 | Stewart |
| 8,731,836 B2 | 5/2014 | Lindores et al. |

(Continued)

FOREIGN PATENT DOCUMENTS

| AU | 2016100314 | * 4/2016 | ............ G06F 15/00 |
| CA | 2888742 A1 | 3/2015 | |

(Continued)

OTHER PUBLICATIONS

Zeynap Unai, Smart Farming Become sEven Smarter With Deep Learning—A Bibliographical Analysis (English), IEEE Access (vol. 8, pp. 105587-105609), Jan. 1, 2020 (Year: 2020).*

(Continued)

*Primary Examiner* — Marilyn G Macasiano
(74) *Attorney, Agent, or Firm* — Ference & Associates LLC

(57) ABSTRACT

One embodiment provides a method, including: obtaining information related to farming activities of a farmer; predicting an annotation category for the information, wherein the annotation category identifies a topic of the information; selecting an annotator for annotating the information based upon the annotation category, wherein the selecting comprises utilizing (i) a social proximity constraint identifying a social connection between the farmer and another farmer and (ii) a farm signature constraint identifying a similarity of the farmer to another farmer; assigning the annotator to annotate the obtained information; and receiving annotations for the information.

14 Claims, 4 Drawing Sheets

(51) Int. Cl.
  *G06N 20/00* (2019.01)
  *A01C 21/00* (2006.01)
  *G06Q 10/06* (2023.01)
  *G06Q 10/0631* (2023.01)
  *G06Q 50/02* (2012.01)

(52) U.S. Cl.
  CPC ......... *G06Q 10/0631* (2013.01); *G06Q 50/02* (2013.01)

(58) Field of Classification Search
  CPC ............. G06Q 10/067; G06Q 30/0246; G06Q 30/0207; G06N 5/04; G06N 20/00; G06N 5/022
  See application file for complete search history.

(56) References Cited

U.S. PATENT DOCUMENTS

| | | | |
|---|---|---|---|
| 9,009,087 | B1 | 4/2015 | Mewes et al. |
| 9,563,852 | B1 | 2/2017 | Wiles et al. |
| 9,745,060 | B2 | 8/2017 | O'Connor et al. |
| 10,477,756 | B1* | 11/2019 | Richt .................... A01B 79/005 |
| 10,912,249 | B1* | 2/2021 | Wilson ................. G05B 13/026 |
| 11,086,922 | B2* | 8/2021 | Funabashi .............. G06Q 10/00 |
| 2002/0103688 | A1 | 8/2002 | Schneider |
| 2013/0051672 | A1 | 2/2013 | Robinson et al. |
| 2018/0146612 | A1 | 5/2018 | Sauder et al. |
| 2018/0177136 | A1* | 6/2018 | Reimann ................ G06Q 10/06 |

FOREIGN PATENT DOCUMENTS

| | | | | |
|---|---|---|---|---|
| EP | 3046066 A1 | 7/2016 | | |
| KR | 2018-0082272 A | * | 7/2018 | ............. G06K 19/07 |

OTHER PUBLICATIONS

Wood,B.A;Blair,H.T;Gray,D.I;Kemp,P.D;Kenyon,P.R;Morris,S.T;Sewell,A.M;Amaral,L,A.N,Agriculture Science in the Wil: A Social Network Analysis of Farmer Knowledge Exchange (English), PLoS ONE, 9(8),e105203, Aug. 14, 2014 (Year: 2014).*

Nyambo, Devotha G; Luhanga, Edith T; Yonah, Zaipuna Q, A Review of Characterization Approaches for Smallholder Farmers: Towards Predictive Far Typologies (English), The Scientific World Journal, 2019, 6121467, May 22, 2019 (Year: 2019).*

Pankaj Dayama et al., "Truthful Interval Cover Mechanisms for Crowdsourcing Applications", Proceedings of the 14th International Conference on Autonomous Agents and Multiagent Systems (AAMAS 2015), Istanbul, Turkey, May 4-8, 2015, 9 pages, Bordini, Elkind, Weiss, Yolum, International Foundation for Autonomous Agents and Multiagent Systems.

Nevzat Onur Domanic et al., "Bipartite Matching with Linear Edge Weights", Department of Computer Science, University of Texas at Austin, Austin, Texas, Oct. 2016, 38 pages.

\* cited by examiner

FARM DATA ANNOTATION AND BIAS DETECTION

BACKGROUND

Farmers grow and provide food products, for example, produce, grain, meat, and the like. The farmers may provide information related to the food products, for example, images of the crops, global positioning system (GPS) data, social media postings identifying information related to the crops, and the like. Some of this information may identify different conditions or qualities of the crops. For example, images of the crops may show a disease that has affected the crop. As another example, an image or social media posting may show or describe a quality or yield of the crop. While the farmers are growing and/or producing the food products, many events could occur that can change the quality of the food product. For example, environmental conditions (e.g., drought, extra rain, rain during a particular growth period, bug infestation, etc.) may change the quality of the food product. Thus, other information may be captured or obtained that may provide some indication of quality or yield of the crop, for example, environmental data, weather conditions, and the like.

Bias represents a prejudice or unfairness towards a particular group. For example, if a user is friends with or likes another person, the user may be biased to help or assist the person. Thus, this bias can cause a user or entity to have preconceived ideas regarding particular people, entities, text, images, or the like. For example, if the user receives information related to the person, the user may automatically assume the information is accurate, regardless of the facts. Thus, in situations where a user is asked to perform a task with respect to different information, the user may allow bias to influence the performance of the task. For example, if the user is labeling images and identifying different entities within the image, the bias of the user may influence the provided labels and may result in inaccurate information labels or a misrepresentation of the information.

BRIEF SUMMARY

In summary, one aspect of the invention provides a method, comprising: obtaining information related to farming activities of a farmer; predicting an annotation category for the information, wherein the annotation category identifies a topic of the information; selecting an annotator for annotating the information based upon the annotation category, wherein the selecting comprises utilizing (i) a social proximity constraint identifying a social connection between the farmer and another farmer and (ii) a farm signature constraint identifying a similarity of the farmer to another farmer; assigning the annotator to annotate the obtained information; and receiving annotations for the information.

Another aspect of the invention provides an apparatus, comprising: at least one processor; and a computer readable storage medium having computer readable program code embodied therewith and executable by the at least one processor, the computer readable program code comprising: computer readable program code configured to obtain information related to farming activities of a farmer; computer readable program code configured to predict an annotation category for the information, wherein the annotation category identifies a topic of the information; computer readable program code configured to select an annotator for annotating the information based upon the annotation category, wherein the selecting comprises utilizing (i) a social proximity constraint identifying a social connection between the farmer and another farmer and (ii) a farm signature constraint identifying a similarity of the farmer to another farmer; computer readable program code configured to assign the annotator to annotate the obtained information; and computer readable program code configured to receive annotations for the information.

An additional aspect of the invention provides a computer program product, comprising: a computer readable storage medium having computer readable program code embodied therewith, the computer readable program code executable by a processor and comprising: computer readable program code configured to obtain information related to farming activities of a farmer; computer readable program code configured to predict an annotation category for the information, wherein the annotation category identifies a topic of the ion information; computer readable program code configured to select an annotator for annotating the information based upon the annotation category, wherein the selecting comprises utilizing (i) a social proximity constraint identifying a social connection between the farmer and another farmer and (ii) a farm signature constraint identifying a similarity of the farmer to another farmer; computer readable program code configured to assign the annotator to annotate the obtained information; and computer readable program code configured to receive annotations for the information.

A further aspect of the invention provides a method, comprising: obtaining information related to farming activities of a farmer; determining a degree of bias of each of a plurality of labelers, wherein the determining comprises utilizing a (i) social proximity constraint graph and (ii) a farm signature constraint graph to predict a bias of each of the plurality of labelers; predicting an annotation type for the information; selecting, based upon the degree of bias and the annotation type, a subset of the plurality of labelers to label the information; and receiving, from the subset of the plurality of labelers, labels for the information.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
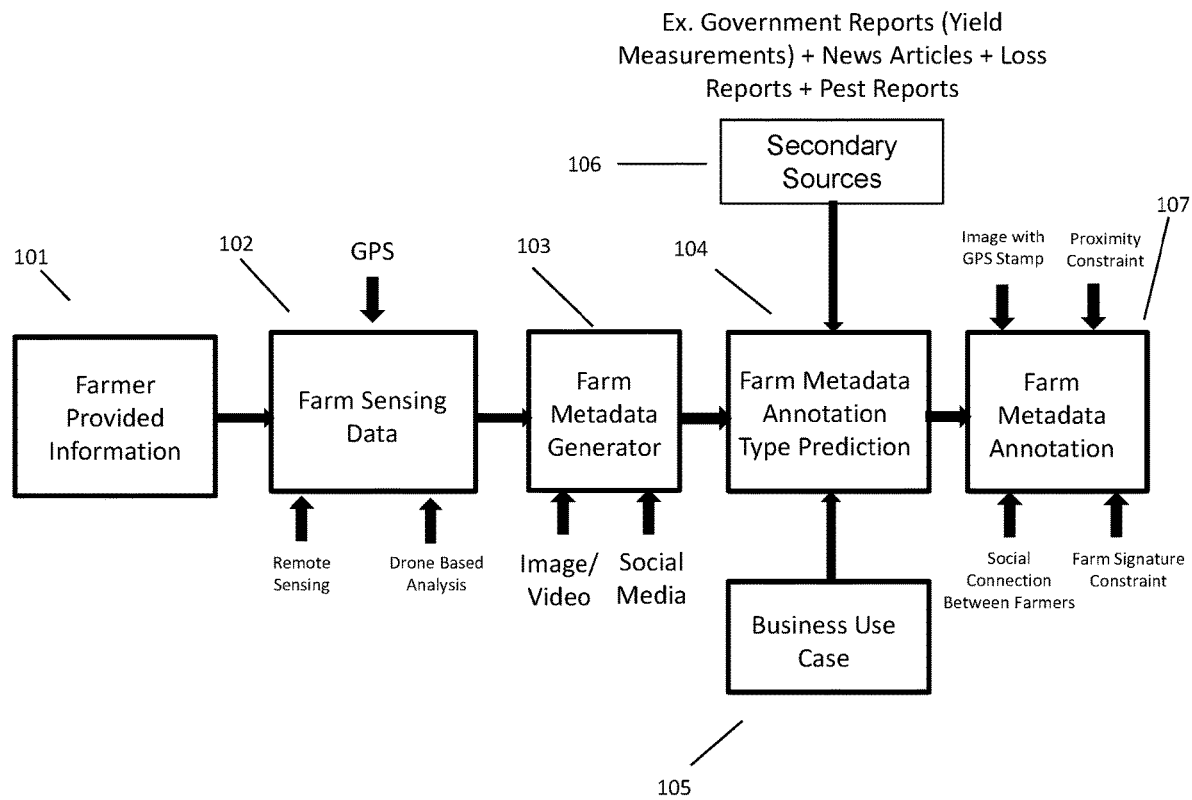
FIG. 1 illustrates a system directed towards determining farm metadata annotation types.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

Annotation tasks require a user to label, translate, select information fulfilling a parameter, or otherwise provide information with regard to provided information. Generally when annotating information for a purpose, an entity may have a large amount of information to annotate. Accordingly, many entities employ a crowdsourcing technique in order to provide such annotations. The entity or user may provide the information requiring annotation to a crowdsourcing platform that includes many different annotators or crowdsourced workers. The annotation task can then be assigned to one or more annotators who then annotate the information using the rules or instructions provided by the requesting entity or annotation client. The annotated information is then provided back to the requesting entity, or client, who can then use the annotated information as desired. Utilizing a crowdsourcing technique to annotate information allows an entity to obtain annotated information quickly. However, by utilizing a crowdsourcing technique the entity loses some control over how the annotations are completed. For example, the entity cannot determine if the annotator performing the annotations was biased.

In other words, a common issue associated with current data annotation systems is that while the crowdsourcing allows for quick annotation of large amounts of information, the systems do not take into account the accuracy of the information being provided to the system from the annotators. Thus, one problem with utilizing crowdsourced workers or annotators is that there is not a technique to determine if the annotator is providing annotations in view of a bias of the annotator. In other words, if the annotator is biased towards a particular group or viewpoint, the annotator may annotate the information under this prejudice. This may result in annotations that are inaccurate or misleading. When other systems or entities use this inaccurate information, the other systems may take actions that they would not have taken if the information would have been accurate, for example, extending a loan or insurance when, with accurate information, the entity would not have extended the loan or insurance.

A farmer can provide information through many different sources, for example, images, video, GPS data, social media posting, and the like. The information may provide indicators of crop quality, crop yield, or other information related to the crops. Thus, this information may be useful to other entities or systems to make decisions regarding the farmers and/or crops, for example, whether loans should be extended, whether crops should be purchased and for what price, whether insurance should be extended, and the like. However, accessing this information and determining whether the information is useful and how it is useful can be difficult and time consuming. Specifically, a person or entity would have to access these multiple sources and determine if the information provides any indicators regarding the crop and what indicators the information is providing. Thus, utilizing crowdsourcing techniques to capture and annotate this information may be helpful. However, in annotating this information the selection of an annotator without bias is critical in order to ensure that the annotated information is accurate. The conventional techniques do not provide a technique for selecting the appropriate annotator for annotating the farm information, particularly, without bias.

Accordingly, the system and techniques as described herein provide a system and technique for selecting an annotator for annotating farm information based upon a predicted annotation category and a social proximity and farm signature of possible annotators. Additionally, the system and techniques can identify a bias of the possible annotator(s) and utilize the possible bias to assist in selecting the annotator. The system obtains information related to farming activities of a farmer. For example, the information may be included in social media postings, GPS data, weather data, environmental data, and the like. The system then predicts an annotation category for the information, where the annotation category identifies a topic of the information.

Based upon the annotation category, the system selects an annotator to annotate the information. In selecting the annotator the system utilizes a social proximity constraint that identifies a social connection between the farmer and another farmer and a farm signature constraint identifying a similarity of the farmer to another farmer. The system may also identify a bias of potential annotators and utilize this identified bias in selecting the annotator. Once the annotator(s) have been selected, the annotator is assigned to annotate the information and the system then receives annotations for the information.

Such a system provides a technical improvement over current techniques for crowdsourced annotation, particularly, crowdsourced farm information annotation. The system attempts to identify the best annotator for annotating information. Instead of relying on traditional crowdsourcing techniques, the system is able to predict an annotation category to more appropriately assign an annotator to the information. Additionally, unlike traditional crowdsourcing techniques, the described system is able to identify a bias of a potential annotator. The bias can then be used in selecting the annotator, thereby providing a system that reduces the amount of bias that may be present in annotations. Therefore, the described system and method provides additional information for recommending annotators, resulting in more accurate and complete annotations while still allowing for the use of crowdsourced workers to perform the time-consuming and tedious task of annotating information.

FIG. 1 illustrates a system and method for determining a farm information annotation type and further for selecting an annotator for annotating the farm information based upon the annotation type. At 101, information related to a farm may be provided or obtained. This information may include information that may possibly be annotated. In other words, the information may include information that is analyzed to determine if it would be useful to annotate. The farmer provided information provided to a system at 101 may include generic information related to the farming activities, for example, identification of the owner of the farm, the crops being grown on the farm, and the like. Other farmer provided information may also be included.

In addition to the farmer provided information, the system may receive or obtain farm sensing data at 102. The farm sensing data 102 may include remote sensing data, such as satellite imaging, sensor data, and the like. The farm sensing data 102 may also include drone based analysis which may utilize information gathered by use of a drone scan. Additionally, information related to the farm, farming activities, or farmer, for example, pictures, audio and text conversations (e.g., SMS messages, emails, etc.), videos, social media postings, and the like, are input into a farm metadata generator at 103. The farm metadata generator 103 may analyze and parse this information to identify if it includes any information that may need to be annotated. In other words, the farm metadata generator 103 may identify any information that may be useful to a downstream entity, and, therefore, would be useful to have annotated.

At 105 a business use case may be identified. The business use case may set guidelines for the information requested when performing annotations on the farm. In other words, the business use case 105 may assist in identifying what information obtained at 101, 102, and 103 should be annotated. The annotated information will then be used by the system in the business use case. Example business use cases include a bank extending a loan, an insurance company extending insurance, a pesticide company identifying a market for pesticides, and the like. The system may also receive secondary source information at 106. Example secondary source information 106 may include information regarding government reports describing potential crop yield measurements, news articles related to agriculture, loss reports, pest reports, and the like.

What follows is an example of utilizing secondary source information 106 and a business use case 105 for identifying the type of information that should be annotated. The secondary source information 106 includes a pest report that describes an issue with corn. The business use case 105 is a bank that has extended crop insurance to the farm. In this example, the bank may want to know how much of the corn was affected by the pest, the quality of the corn that was able to be harvested, and the like. Instead of relying solely on the farmer to identify this information, the bank may wish to have information from other sources to verify the information provided by the farmer. However, the bank will not want to sift through all the possible information.

Accordingly, the bank wants to utilize annotators to annotate relevant information. For example, the bank may determine what areas of the farm are of most importance in determining a crop insurance risk and a potential rate, which may then act as guidelines in collecting annotation information for the farm. Using the secondary sources 106 and business use case 105, the system predicts an annotation type 104 of the obtained information 101, 102, and 103. Once the annotation type has been predicted 104, the system sends the information having an annotation type that would be relevant to the use case 105 to an annotator for annotating 107. The farm annotations 107 may be performed by annotators that are selected based upon proximity constraints, social connections between the farmer and potential annotator, farm signature constraint, location of the annotators as determined by images with GPS stamps, and the like.

Figure 2:
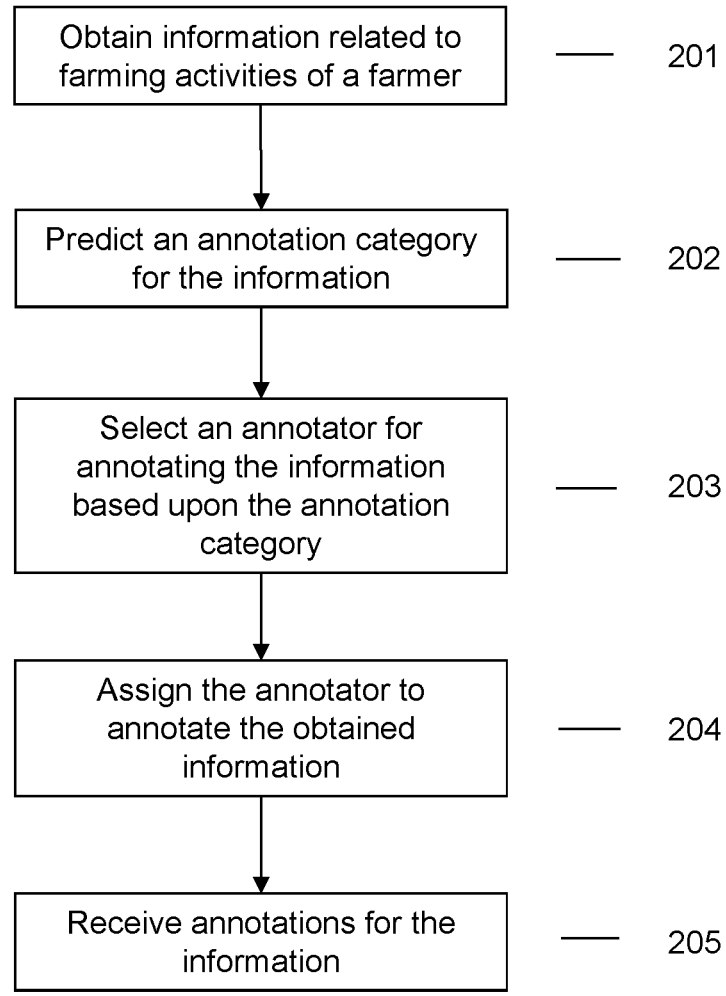
FIG. 2 illustrates a method for determining an annotator to perform farm information annotations based on annotator bias.

Referring to FIG. 2, a system and method are described for receiving information related to farming activities of a farmer and selecting an appropriate annotator/labeler to annotate/label the farm information/metadata. At 201, the system may obtain information related to farming activities of a farmer. Obtaining the information may include accessing a data storage location, receiving information from another source, or the like. In other words, obtaining the information may include both proactively capturing the information and reactively receiving the information. Farming activities may include any activities that are performed on a farm, for example, crop harvest, crop planting, pesticide application, crop sales, crop status check, and the like. Accordingly, the information obtained may include, but are not limited to, GPS data, images of crops, social media postings related to crops or farming activities, crop yields, weather data, environmental conditions, and the like. For example, the farming activity data may be obtained by a system over a network (e.g., the Internet, a local network connection, a remote network connection, etc.), and may provide location data with respect to a farm. As another example, the farming activity data may provide information describing growing conditions and predicted crop yields.

At 202, the system may predict an annotation category for the information obtained by a system at 201. In predicting an annotation category, farming activity data, also referred to as farm metadata, obtained by a system may be analyzed and parsed. Since the farming activity data may include large amounts of data and only a subset of the data would be useful for annotation, the system may filter the farming activity data. Thus, in analyzing the farm metadata, the system may identify which of the farming metadata are important. The analysis may be performed in view of the business use case or secondary source information. In other words, the business use case and/or secondary source information may provide an indication of what type of farm metadata is useful or important.

To identify the important farm metadata, the system may utilize a supervised classifier. The supervised classifier may be used to predict the annotation type. Once the annotation type is predicted, the system can compare the annotation type against the secondary sources and/or business use case to determine if the annotation type corresponds to a type that would be considered important in view of the secondary sources and/or business use case. The obtained information may be provided to the classifier in an attempt to categorize the obtained data based on common traits between different information. The classifier used to categorize the farm metadata is a supervised classifier, meaning a person provides initial input on how information should be classified. Then, utilizing the initial input and through receiving additional information to classify and user feedback regarding information previously classified by the classifier, the classifier becomes more intelligent and is able to classify information without manual intervention. The supervised classifier is a trained classifier that analyzes the farm metadata to predict the annotation type.

The farm metadata (e.g., geo-location, existing information, images, video, voice, text, conversation details, insurance place, government regulations, etc.) are provided as input and each datum is represented as a feature in a feature representation. An example feature representation may be: $f_1^{multi-media}, \ldots f_R^{multi-media}, f_1^{gps}, f_1^{conversation}, \ldots, f_p^{conversation}, \ldots, f_1^{insurance}, \ldots, f_t^{insurance}, f_1^{dom-report}, \ldots f_n^{dom-report}$ As can be seen in the example feature representation, each feature is represented as a function, for example, functions of multi-media data, functions of GPS data, functions of conversational data of a farmer while capturing farm metadata, functions of insurance guidelines, and functions of domain specific reports. The feature representation may then be fed to the classifier that can then predict the annotation type utilizing the feature representation. Example annotation types include type of disease, crop type identification, yield estimation, crop health monitoring, and the like. Thus, the annotation type identifies a category or topic related to the information. For example, an image of a crop provided by farmer may be identified under a crop type identification category.

At 203, an annotator may be selected, based upon the annotation category output by the classifier, to perform annotations on the information. In other words, the system may attempt to select an annotator who would be best suited for annotating the information based upon the annotation type. As an example, if the annotation type is "type of disease" the system may attempt to select an annotator or labeler who has knowledge of crop diseases. As another example, if the annotation type is "crop type identification" the system may attempt to select an annotator or labeler who has knowledge of crop types. Thus, the annotation type or category can be used to select a more appropriate annotator for the annotation task, thereby resulting in more accurate and efficient annotations.

Additionally, in selecting an appropriate annotator, two base constraints may be utilized to determine the most appropriate annotator. First, a social proximity constraint may be utilized. The social proximity constraint may identify a social connection between the farmer who provided the information to be annotated and the potential farmer who may be acting as the annotator. The social proximity constraint may be used in determining the correct annotator in order to find an annotator who may have a connection to the farmer. For example, a neighboring farmer may have an actual knowledge of the crops, growing conditions, and other farming activities of the farmer, thereby allowing the neighboring farmer to provide more accurate annotations. Thus, annotators having a higher social connection to the farmer providing the information to annotate may be preferred annotators.

The social proximity based constraint may be determined by utilizing the initial farm metadata obtained by a system, further analyzing a farmer's land, and then identifying the neighboring farmers within a predetermined distance. Further analysis of a farmer's land may include performing field boundary identification using satellite images and tracking a farmer's GPS information while on the farm to gather detailed information regarding the farm land (e.g., where certain crops are located, time spent in specific areas of the farm, etc.). The combination of the farm metadata, further analysis of a farmer's farm land, and the identification of neighboring farmers to be a potential annotator, may output an estimated social connection value between the farmer and the potential annotator. The social connection may also be identified through the use of secondary sources, for example, social media, images, video, and the like. The secondary sources may provide an indicator of how socially close the farmer and the potential annotator are to each other. Thus, a potential annotator having a social proximity less than a predetermined threshold may be a preferred annotator.

The second constraint, a farm signature-based constraint, may identify a similarity between the farmer who provided the information to be annotated and a potential annotator. Specifically, the farm signature-based constraint may identify a similarity between the farming activities of the farmer and the potential annotator. Potential annotators who have similar farming activities (e.g., crops, geographical locations/terrain, growing conditions, weather conditions, environmental conditions, etc.) may be better suited for annotating the information since these annotators may have a more in-depth or accurate knowledge of the information that may be provided by the farmer. Thus, a potential annotator having a farm signature-based constraint or similarity greater than a predetermined threshold may be a preferred annotator.

To create the farm signature-based constraint, the system may utilize crops common across multiple farms that may also share common weather conditions to determine similarities. The farm signature is generated based on farm sensed data obtained from remote sensing (e.g., satellite imaging, drone scanning, etc.) along with additional information provided by farmer over time. The combination of the generated farm signature and weather conditions affecting a farm may permit a system to identify a neighboring farmer to potentially perform annotations of the information. Farmers on neighboring farms are commonly used to perform annotations because it may be common for similar crops to be grown in the same area, thereby giving the neighbor farmer more accurate information and, therefore, more accurate and efficient annotations.

In determining the social proximity constraint and the farm signature constraint, the system may construct two separate graphs, one for each constraint. These graphs may be updated over time in an attempt to accurately describe the relationship between the farmer and potential annotators.

The two graphs may then be weighed against each other, and using a bipartite graphing technique, the system may determine the most appropriate annotator. Each of the graphs is produced utilizing a farm land and the farmer as the vertex in the graph. Other farmers or potential annotators are represented as nodes in the graph. The edges between nodes then represent a relationship between the nodes connected by the edge.

The edges can then be assigned a value or weight based upon the relationship. For example, for the social proximity constraint graph, the edge or constraint is estimated between the farmers by analyzing the social connection between the nodes, for example, based upon how often a farmer and potential annotator pass by each other, based upon how often a farmer and potential annotator have conversations, and the like. As another example, for the farm signature-based constraint, the edge or constraint is estimated between the farmers by analyzing the similarity between the nodes, for example, by analyzing the farming conditions through remote sensing, by analyzing the crop type through farmer provided information, and the like. The temporal aspects of the farm signatures are estimated and presented between the nodes on the graph.

The graphs produced are then updated over time based on farming activities and secondary source guidelines. Updating information within a graph may start with the data captured by a farmer and provided to the system. This farm metadata may include, but is not limited to, text, images, videos, and conversations related to the farm. As discussed previously, a system may then process the farm metadata and identify the correct metadata annotation type based on the categorization. Over time, the node attributes describing a farm's land, crops, and the farmer may change, based on the farmer's activity, for example, because of variable change in weather and potential crop information (e.g., crop yields, amount of crops planted per year, amount interactions with neighboring farmers, etc.). Based on the farming activities performed over time, node attributes may change which may ultimately strengthen node attributes because of a system's ability to gather more information.

As a system tracks a famer's activity over time, and node attributes get updated when new and/or additional farm metadata are supplied, a system will update the graph which is relevant to the new and/or additional information provided. For example, if a farmer is recorded providing a chemical to the crops in an attempt to expedite growth, only the graph affiliated with the farm signature-based constraint may be updated, while the social proximity constraint remains the same. The graphs can then be utilized in identifying an annotator for annotating the information. In other words, the incoming edges of the nodes present in each graph are considered for a farm metadata labeling task. The farm metadata labeling task describes the edges in a way that may be understood by both graphs describing constraints. This labelling may assist in later determining similarities between the two graphs. A bipartite graph matching technique may then be used to identify nodes that correspond to the annotation activities needed to be completed.

A graph may then determine a node weight in a graph based on the difficulty of completing an annotation activity, and an edge weight which may then be estimated based on the annotator cost for performing the annotation activity. The cost of an annotator may be considered as a function of the distance between the source node and the target node, and the annotator bias. The following function, described as EQN. 2, illustrates the cost of the annotator:

$$\text{Cost}(V_i^{src}, V_j^{tgt}) = w_{distance} * f^{distance}(v_i^{src}, v_j^{tgt}) + w_{bias} * f^{bias}(V_i^{src}, \text{FarmMetadata}_j^{activity})$$

where $W_{distance}$ and $w_{bias}$ can be fine-tuned based on annotator details, $f^{distance}(V_i^{src}, V_j^{tgt})$ may be computed based on the cost involved in the physical distance between the annotator who may have to travel while performing the farm metadata annotation activity, and $f^{bias}(V_i^{src}, \text{FarmMetadata}_j^{activity})$ may be computed by estimating the annotator bias for performing the annotation activity, which may be learnt over time. The cost of the node may be considered based on the type of annotation activity and effort involved in the annotation activity.

Identifying a bias of the annotator is important so that the annotations can be performed accurately, without bias. To identify a bias of the annotator, the system predicts a bias score for each of the plurality of potential annotators using the social proximity constraint and the farm signature constraint. While the system would ideally like to use an annotator who is most knowledgeable about the information being annotated, utilizing an annotator who is too socially or geographically close to the farmer may result in selecting an annotator who would be biased to help the farmer. For example, if the farmer has provided information that indicates that a crop yield is better than it actually is, the system would want to select an annotator who would identify this inconsistency rather than affirm the inconsistency.

To predict a bias of a potential annotator, the system may utilize a classifier to predict an annotation for the information. This same information may also be provided to a potential annotator and an annotation received from the potential annotator. The system can then compare the predicted annotation with the received annotation. Based upon this comparison, the system can assign a bias value which identifies how biased the received annotation is with respect to the predicted annotation. This process can be iteratively performed in order to assign a bias score or value to the potential annotation. The bias score may be a single overall bias score or may be broken up by different farmers. For example, a potential annotator may have one bias score with respect to one farmer and another bias score with respect to a different farmer.

The system may also utilize multiple annotators. For example, multiple annotators may be implemented based on identifying an amount of bias from potential annotators that exceeds a predetermined threshold. In other words, if the system determines that an annotator has historically provided biased annotations, the system may assign multiple annotators to the information. Annotations received from the multiple annotators can then be weighted and averaged to select the "correct" annotation for the information. Additionally, the selected annotation may be used to update a bias score for the annotators. For example, if a historically biased annotator continues to provide annotations that match the selected annotation, the bias score of that annotator may be adjusted to a value that identifies less bias.

At 204, an annotator may be assigned to complete the annotation of the information. The annotator assigned to complete the annotation may include the annotator having the least amount of annotator bias, having the closest social proximity, and most similar farm. In other words, the selected annotator may balance the social proximity and farm similarity with the annotator bias to select an annotator who will provide the most accurate and efficient annotations back to a user.

Once the annotator(s) has annotated the information, a user may receive annotations for the desired information at 205. The received annotations may be weighted based upon the social proximity constraint and the farm signature constraint. For example, if multiple annotators were employed, the annotations received from each annotator may be weighted in selecting the "correct" annotation. The weightings may also be used to produce a confidence score related to how accurate the annotations are. An annotation having a lower confidence score may require an additional annotator or manual intervention whereas an annotation having a higher confidence score may be treated as accurate with no additional input.

Figure 3:
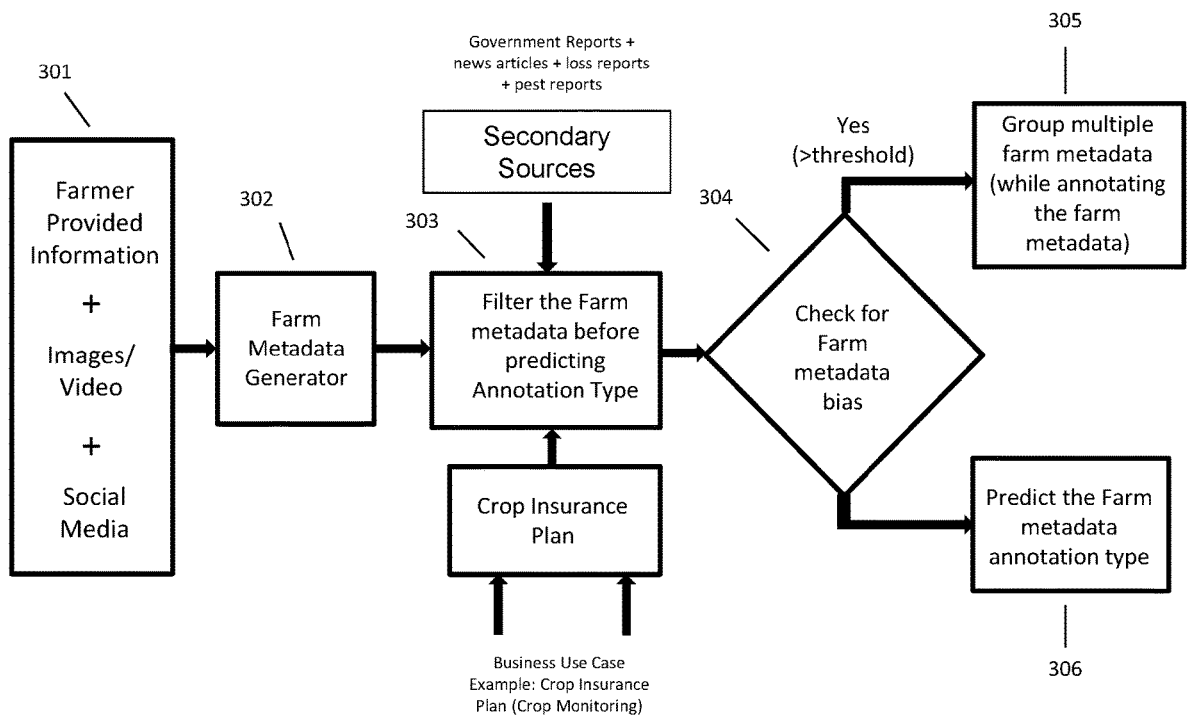
FIG. 3 illustrates a system directed towards determining bias associated with annotation activity data provided by an annotator.

FIG. 3 illustrates an overall architecture for the system including determining if an annotator may be biased. At 301, farming activity information may be received. Farming activity information may include, but is not limited to, images, videos, audio, text communications, social media postings and communications, and the like. The information may then be provided to the farm metadata generator at 302. The farm metadata generated from the generator at 302, may be filtered, at 303, based upon secondary sources (e.g., government reports, news articles, loss reports, pest reports, etc.) and business use cases. The crop insurance plan is the example business use case utilized in FIG. 3. The filtering may ensure that only the farm metadata that are important in view of the business use case and/or secondary sources are sent for annotation.

At 304, the system may check for farm metadata bias of one or more potential annotators. One technique for identifying farm metadata bias is by comparing the information provided by an annotator to information provided by a Subject-Matter-Expert (SME). An SME may provide an expert prediction regarding farm metadata and the overall health associated with a farm. Identifying farm metadata bias may also be based upon social proximity constraints and farm signature-based constraints. A bias of the annotator may be identified based upon historically provided annotations. If bias is over a predetermined threshold, the system may group multiple farm metadata while the annotation is being performed at 305. In other words, while a potentially biased annotator is performing the annotations, the system may group all of the annotated metadata received from that annotator. The system may then perform an additional analysis on these annotations, for example, having another annotator annotate the same information, comparing the annotations to a system predicted annotation, or the like. On the other hand, if no bias is detected at 304, the system may predict the farm metadata annotation type at 306 and then assign the most appropriate annotator to annotate the farm metadata based upon the annotation type.

Figure 4:
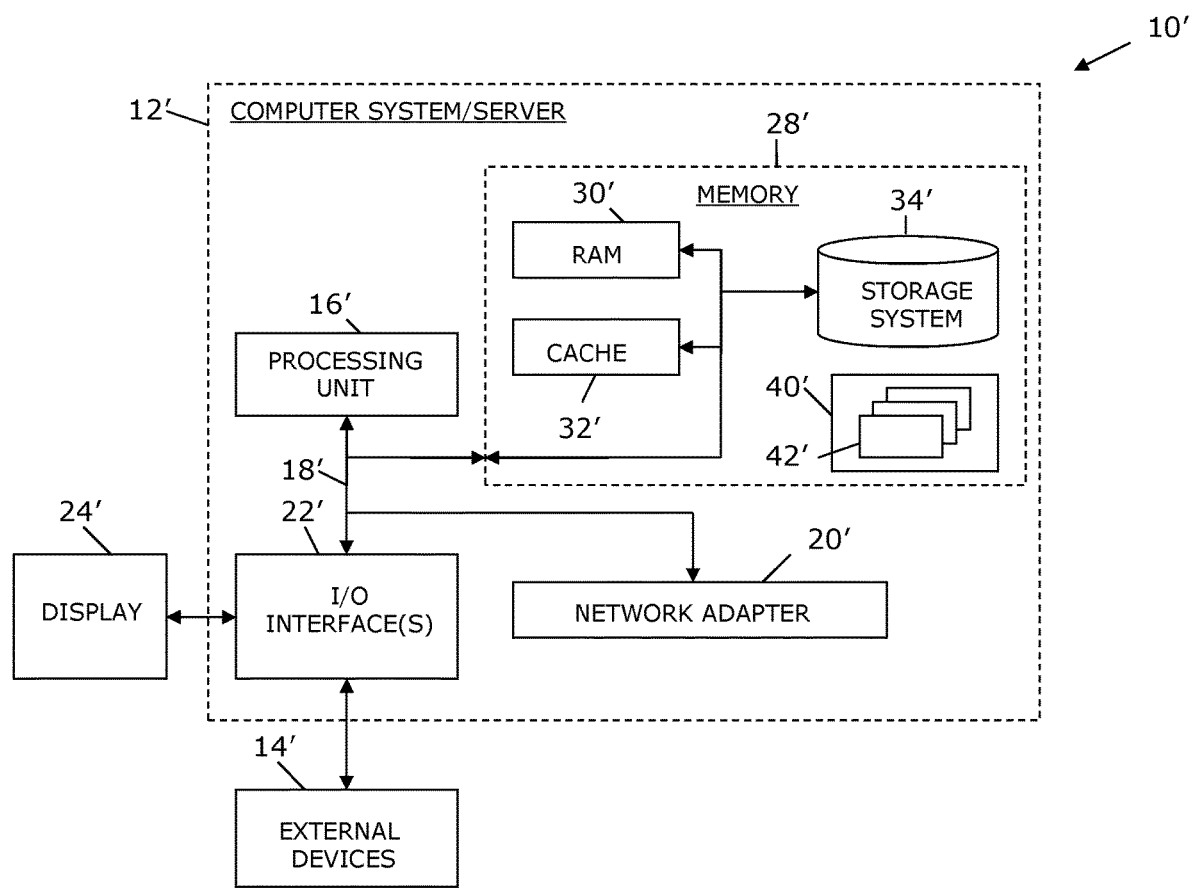
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   obtaining information related to farming activities of a farmer;
   predicting an annotation category, identifying a topic, for the information by using a supervised classifier that predicts an annotation type for the information, determines, based upon a comparison against secondary sources, whether the information is important, and identifies, for information determined as important, a topic of the information using the secondary sources;

selecting an annotator for annotating the information based upon the annotation category, wherein the selecting comprises utilizing (i) a social proximity constraint identifying a social connection between the farmer and another farmer within a predetermined threshold and (ii) a farm signature constraint identifying a similarity of the farmer to another farmer exceeding a predetermined threshold, wherein the selecting an annotator comprises predicting a bias score for each of a plurality of annotators utilizing the social proximity constraint and the farm signature constraint and utilizing the bias score in the selecting an annotator;

assigning the annotator to annotate the obtained information; and receiving annotations for the information.

2. The method of claim 1, comprising identifying a subset of the information as relevant to a use case for the information utilizing the annotation category, wherein the identifying comprises (i) accessing at least one secondary source related to the use case and (ii) identifying relevant information based upon information identified as important within the at least one secondary source.

3. The method of claim 1, comprising weighting the received annotation based upon (i) the social proximity constraint and (ii) the farm signature constraint.

4. The method of claim 1, wherein the predicting comprises (i) utilizing a classifier to predict an annotation for the information, (ii) comparing the predicted annotation to a received annotation, and (iii) assigning a bias value to the received annotation.

5. The method of claim 1, wherein the social proximity constraint is represented in a graph, the graph having a plurality of nodes and edges, each node representing a farmer, and each edge representing a social connection between two nodes connected by the edge.

6. The method of claim 1, wherein the assigning comprises assigning a plurality of annotators responsive to determining that an annotator has historically provided biased annotations.

7. An apparatus, comprising:

at least one processor; and a computer readable storage medium having computer readable program code embodied therewith and executable by the at least one processor, the computer readable program code comprising:

computer readable program code configured to obtain information related to farming activities of a farmer;

computer readable program code configured to predict an annotation category, identifying a topic, for the information by using a supervised classifier that predicts an annotation type for the information, determines, based upon a comparison against secondary sources, whether the information is important, and identifies, for information determined as important, a topic of the information using the secondary sources;

computer readable program code configured to select an annotator for annotating the information based upon the annotation category, wherein the selecting comprises utilizing (i) a social proximity constraint identifying a social connection between the farmer and another farmer within a predetermined threshold and (ii) a farm signature constraint identifying a similarity of the farmer to another farmer exceeding a predetermined threshold, wherein the selecting an annotator comprises predicting a bias score for each of a plurality of annotators utilizing the social proximity constraint and the farm signature constraint and utilizing the bias score in the selecting an annotator;

computer readable program code configured to assign the annotator to annotate the obtained information; and computer readable program code configured to receive annotations for the information.

8. A computer program product, comprising:

a computer readable storage medium having computer readable program code embodied therewith, the computer readable program code executable by a processor and comprising:

computer readable program code configured to obtain information related to farming activities of a farmer;

computer readable program code configured to predict an annotation category, identifying a topic, for the information by using a supervised classifier that predicts an annotation type for the information, determines, based upon a comparison against secondary sources, whether the information is important, and identifies, for information determined as important, a topic of the information using the secondary sources;

computer readable program code configured to select an annotator for annotating the information based upon the annotation category, wherein the selecting comprises utilizing (i) a social proximity constraint identifying a social connection between the farmer and another farmer within a predetermined threshold and (ii) a farm signature constraint identifying a similarity of the farmer to another farmer exceeding a predetermined threshold, wherein the selecting an annotator comprises predicting a bias score for each of a plurality of annotators utilizing the social proximity constraint and the farm signature constraint and utilizing the bias score in the selecting an annotator;

computer readable program code configured to assign the annotator to annotate the obtained information; and computer readable program code configured to receive annotations for the information.

9. The computer readable program code of claim 8, comprising identifying a subset of the information as relevant to a use case for the information utilizing the annotation category, wherein the identifying comprises (i) accessing at least one secondary source related to the use case and (ii) identifying relevant information based upon information identified as important within the at least one secondary source.

10. The computer readable program code of claim 8, comprising weighting the received annotation based upon (i) the social proximity constraint and (ii) the farm signature constraint.

11. The computer readable program code of claim 10, wherein the predicting comprises (i) utilizing a classifier to predict an annotation for the information, (ii) comparing the predicted annotation to a received annotation, and (iii) assigning a bias value to the received annotation.

12. The computer readable program code of claim 8, wherein the social proximity constraint is represented in a graph, the graph having a plurality of nodes and edges, each node representing a farmer, and each edge representing a social connection between two nodes connected by the edge.

13. The computer readable program code of claim 8, wherein the assigning comprises assigning a plurality of annotators responsive to determining that an annotation has historically provided biased annotations.

14. A method comprising;
obtaining information related to farming activities of a farmer;
determining a degree of bias of each of a plurality of labelers, wherein the determining comprises utilizing a (i) social proximity constraint graph identifying social connections between the farmer and another farmer within a predetermined threshold and (ii) a farm signature constraint graph identifying a similarity of the farmer to another farmer exceeding a predetermined threshold, to predict a bias of each of the plurality of labelers;
predicting, using a supervised classifier, an annotation type for the information by determining, using the supervised classifier and based upon a comparison against secondary sources, whether the information is important, and identifying, for information determined as important, a topic of the information using the secondary sources;
selecting, based upon the degree of bias and the annotation type, a subset of the plurality of labelers to label the information; and
receiving, from the subset of the plurality of labelers, labels for the information.

* * * * *